United States Patent
Hamaguchi et al.

(10) Patent No.: US 7,365,933 B2
(45) Date of Patent: Apr. 29, 2008

(54) SERVO INFORMATION RECORDING METHOD, MAGNETIC RECORDING MEDIA, AND MAGNETIC DISK APPARATUS

(75) Inventors: Takehiko Hamaguchi, Kanagawa (JP); Hideaki Maeda, Kanagawa (JP); Kazuaki Usui, Kanagawa-ken (JP); Kazuhisa Shishida, Kanagawa (JP); Takashi Konishi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 76 days.

(21) Appl. No.: 11/331,921

(22) Filed: Jan. 12, 2006

(65) Prior Publication Data

US 2006/0152843 A1 Jul. 13, 2006

(30) Foreign Application Priority Data

Jan. 12, 2005 (JP) .............................. 2005-005609

(51) Int. Cl.
*G11B 5/596* (2006.01)

(52) U.S. Cl. .................................................. 360/77.08

(58) Field of Classification Search .................. 360/75, 360/48, 78.04, 77.02, 77.08
See application file for complete search history.

(56) References Cited

U.S. PATENT DOCUMENTS

| | | | |
|---|---|---|---|
| 4,578,723 A | | 3/1986 | Betts et al. |
| 6,005,737 A | * | 12/1999 | Connolly et al. ............. 360/75 |
| 7,110,209 B2 | * | 9/2006 | Ehrlich et al. ........... 360/77.08 |
| 2002/0057509 A1 | | 5/2002 | Nishida et al. |
| 2002/0131199 A1 | | 9/2002 | Takeo |
| 2006/0215306 A1 | * | 9/2006 | Ehrlich et al. ................ 360/75 |

FOREIGN PATENT DOCUMENTS

JP 58-222468 A 12/1983

* cited by examiner

*Primary Examiner*—Fred F. Tzeng
(74) *Attorney, Agent, or Firm*—Townsend and Townsend and Crew LLP; Patrick Duncan

(57) ABSTRACT

Embodiments of the invention provide optimum servo patterns for perpendicular magnetic recording method. In one embodiment, a burst field of servo patterns is composed of burst-signal parts in each of which a constant frequency occurs successively and zero-signal parts each of which has been demagnetized to a state of zero-magnetization, and the total magnetization of the burst field is made approximately 0. The zero signal portions are formed by shutting off a write current at a time during an operation to record servo patterns on a disk initialized to a state of zero-magnetization. The total magnetization of all servo patterns is made approximately 0 by encoding an address mark field and a track code field of servo patterns by a phase shift method.

16 Claims, 10 Drawing Sheets

SERVO INFORMATION RECORDING METHOD, MAGNETIC RECORDING MEDIA, AND MAGNETIC DISK APPARATUS

CROSS-REFERENCES TO RELATED APPLICATIONS

This application claims priority from Japanese Patent Application No. JP2005-005609, filed Jan. 12, 2005, the entire disclosure of which is incorporated herein by reference.

BACKGROUND OF THE INVENTION

The present invention relates to a magnetic disk apparatus for recording information, and more particularly, to a servo system of an apparatus using a disk for holding data composed of information magnetized perpendicularly to a film surface.

A magnetic disk apparatus magnetically writes and reads information to and from a rotating disk by moving a head in the radius direction of the disk to accurately position the head over a target data track. The disk has data areas where data is recorded and servo areas where servo patterns used to position the head over a data track are recorded.

Figure 5:
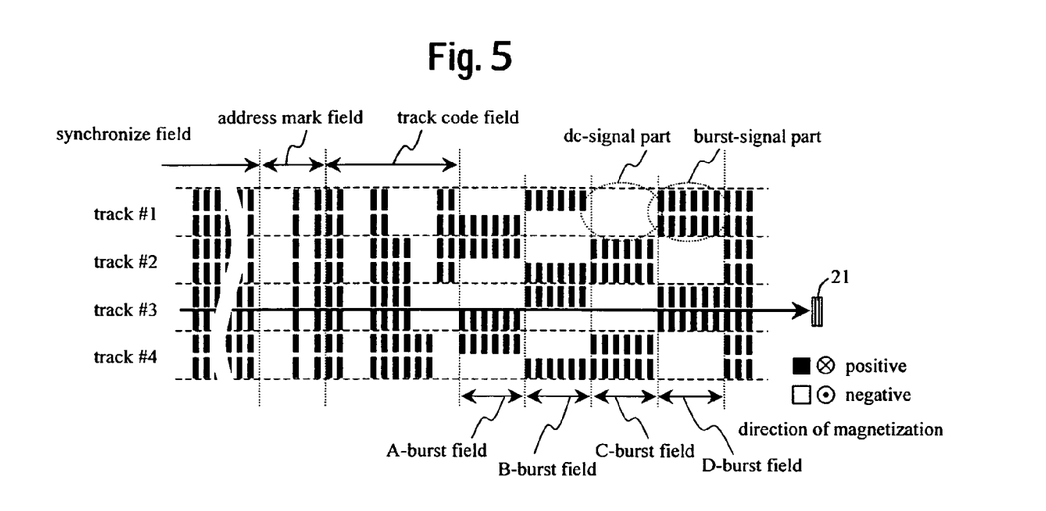
FIG. 5 is a diagram showing an example of servo patterns of a conventional magnetic disk apparatus.

FIG. 5 shows an example of servo patterns recorded in a servo area. A reproduction device reproduces servo patterns while traveling from left to right relative to the rotating disk based on FIG. 5. The servo patterns include successive patterns referred to as a synchronize field which is designed to reduce effects of variations in magnetic characteristics of the disk and in the floating height of the head. Also included in the servo patterns are address mark fields each of which is used to detect the time when a track code field begins. The track code field holds track number information which can provide a head position signal to specify a head position out of the entire disk surface. Head positioning information more detailed than a track number is obtained by decoding information recorded in A- to D-burst fields. A- and B-burst fields are shifted in position from C- and D-burst fields by one half the track width. This arrangement is similar to that disclosed in JP-A No. 222468/1983 and is used in many magnetic disk apparatuses.

BRIEF SUMMARY OF THE INVENTION

Figure 15:
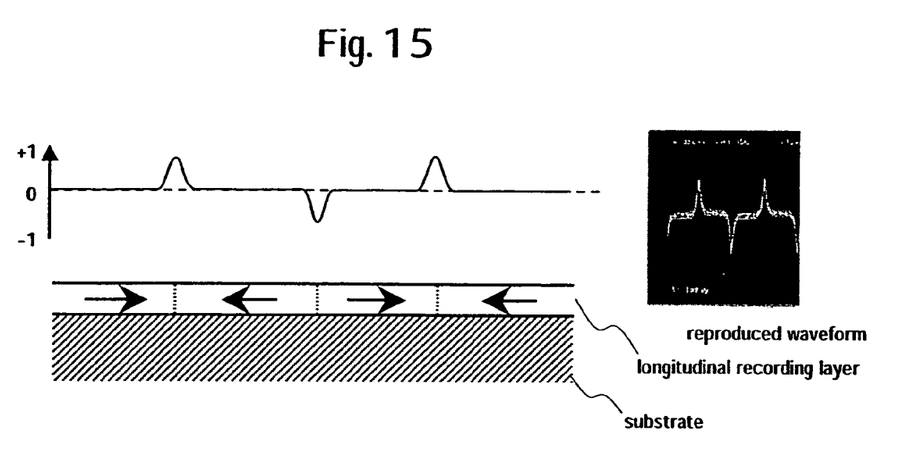
FIG. 15 is a diagram showing a configuration of a longitudinal recording medium, a reproduction magnetic field generated in a recording layer, and a corresponding reproduction waveform.
Figure 16:
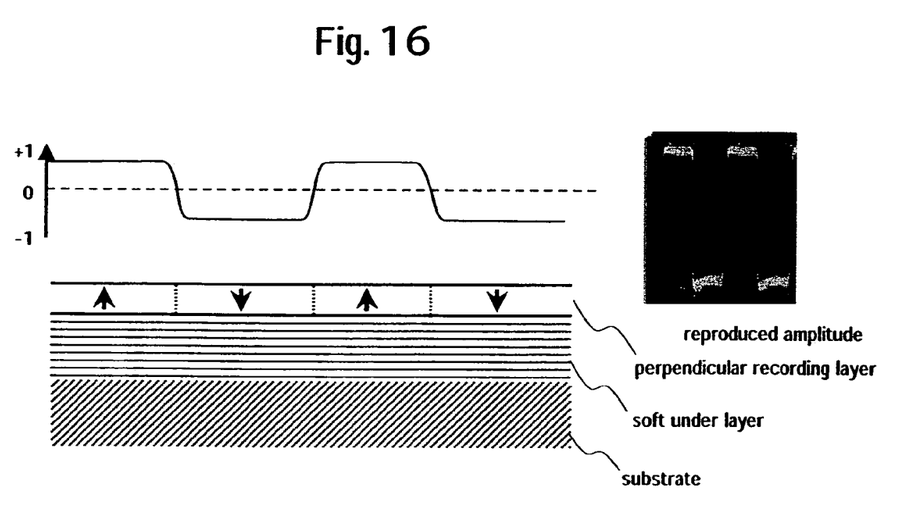
FIG. 16 is a diagram showing a configuration of a perpendicular recording medium, a reproduction magnetic field generated in a recording layer, and a corresponding reproduction waveform.

A diagram showing a structure of an in-plane medium having an easy axis perpendicular to the plane and reproduction magnetic fields generated by recorded patterns is shown in FIG. 15. In the in-plane medium, reproduction magnetic fields are generated at locations in a recording film where the direction of magnetization is reversed. As a result, a reproduction waveform as shown in the picture in FIG. 15 is obtained. On the other hand, in double-layered media composed of a lamination of a perpendicular recording layer having an easy axis perpendicular to the medium plane and a soft layer, reproduction magnetic fields are generated at locations where the direction of magnetic field is unchanged. As a result, a reproduction waveform as shown in the picture in FIG. 16 is obtained. For this reason, in the case of low-frequency recording patterns in particular, the reproduction waveform contains many dc-signal responses.

Figure 6:
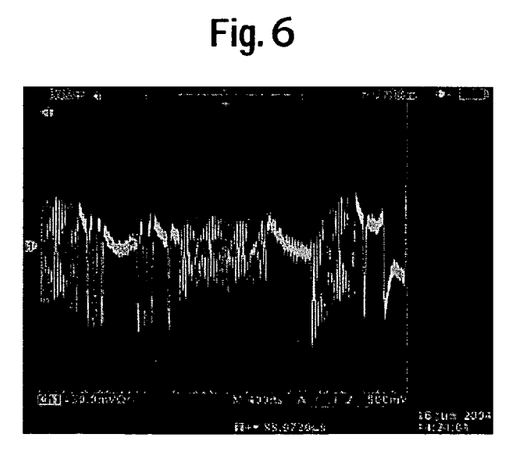
FIG. 6 is a diagram showing an example reproduction waveform of servo patterns of a conventional magnetic disk apparatus.

A reproduction waveform generated at a location denoted as reproduction device 21 in FIG. 5 is shown in FIG. 6. Servo patterns include many low-frequency recording patterns. When a perpendicular magnetic recording method is used, the dc-signal response generated from the low-frequency patterns is affected by a high-pass filter made up of a coupling capacitor causing the reproduction waveform baseline to become largely irregular in the vertical direction. Such waveform irregularity causes a loss in the dynamic range of an A/D converter or a buffer amplifier. The dc-signal response generates a leakage magnetic field biased toward one pole causing the operational points of the reproduction device and the recording device of a head to be shifted and the characteristics of the devices to deteriorate.

Figure 7:
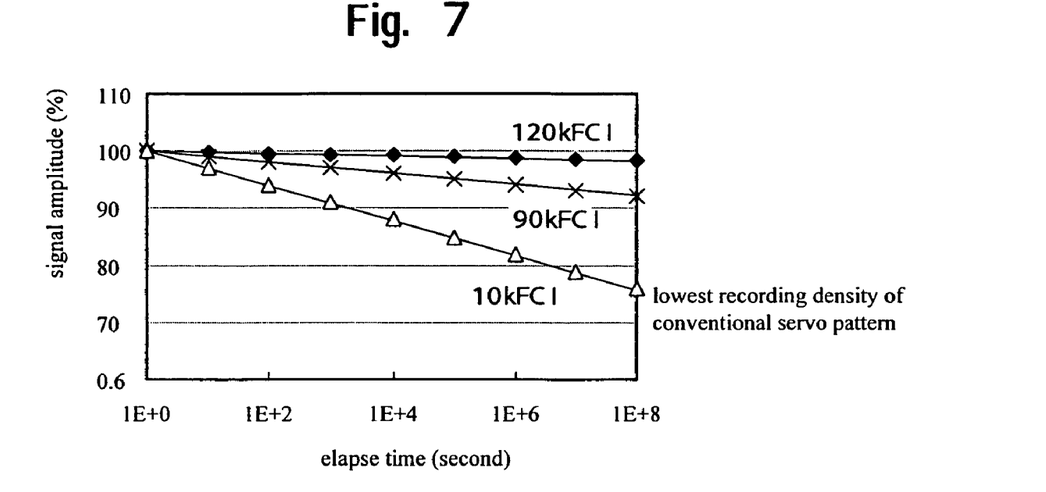
FIG. 7 is a diagram for explaining differences, according to the recording density, in decreases of reproduction output with the passage of time.

From the point of view of the reliability of a magnetic disk apparatus, it is important that bits formed on a disk remain in a stable state for extended periods of time. Curves illustrating how the reproduction output of magnetized patterns recorded by perpendicular magnetic recording decreases with the passage of time are shown in FIG. 7. The curves represent three example cases in which the recording densities are 10 kFCI, 90 kFCI, and 120 kFCI, respectively. Patterns with a lower recording density cause a larger decrease in the reproduction output. This is because, in perpendicular magnetic recording, a higher recording density leads to a more stable state with fewer demagnetizing fields. The conventional servo patterns as explained with reference to FIG. 5 contain many components of low recording densities of about 10 kFCI. Therefore, applying such conventional servo patterns to perpendicular magnetic recording poses a problem that the servo patterns disappear as time passes.

Figure 18:
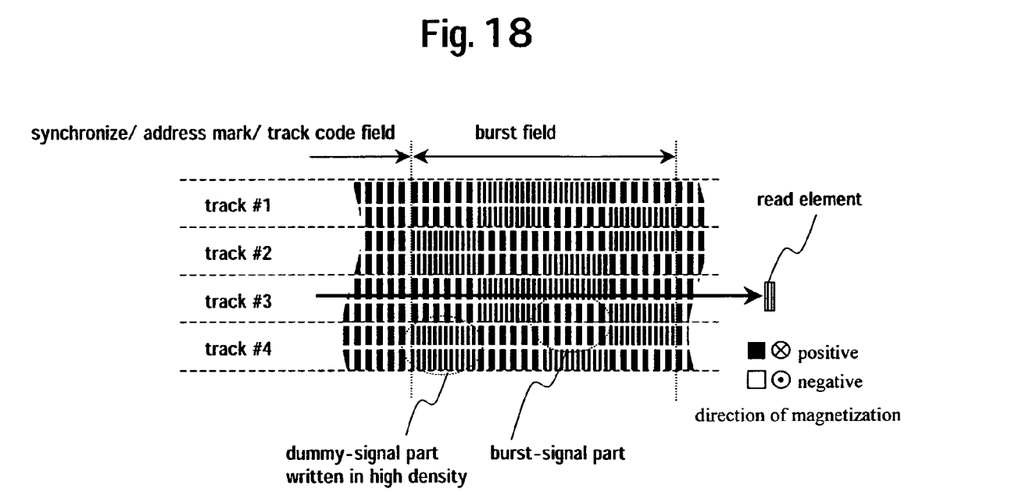
FIG. 18 is a diagram showing an example of servo patterns using a high-frequency dummy signal.

To avoid the phenomenon, servo patterns embedded with, instead of dc-signal responses, dummy-signal bits in a high recording density have been proposed in JP-A No. 150729/2002. An example of the servo patterns is shown in FIG. 18. The technology makes it possible to decrease the low density components contained in servo patterns and thereby improve the stability of servo patterns. The dummy-signal bit patterns make the reproduction amplitude smaller when the frequency is higher, making it easier to separate them from burst signals. To enable recording a high frequency, however, involves a cost of improving a servo track writer. In addition, dummy-signal bit patterns even of a high frequency generate a reproduction magnetic field causing noise components to be generated in burst signals and thereby deteriorate repeatable run-out (RRO) error components of a head position signal.

Figure 8:
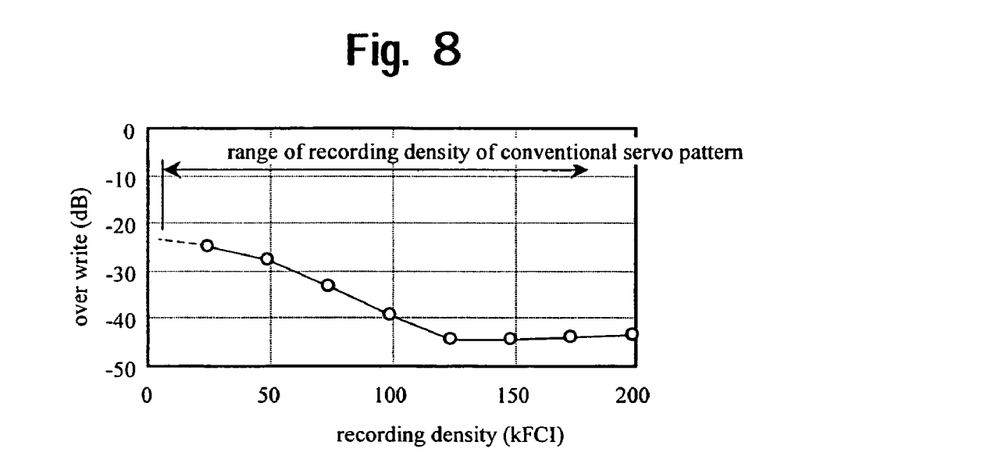
FIG. 8 is a diagram for explaining differences in overwrite performance according to the recording density.

A relationship between recording density and overwrite performance is shown in FIG. 8. The overwrite performance deteriorate as the recording density decreases. This is because, in perpendicular magnetic recording, a higher recording density results in fewer demagnetizing fields and more ease in writing. When perpendicular magnetic recording is used to write the conventional servo patterns as described with reference to FIG. 5, the writing-ability of a head used to write the servo patterns is insufficient and, therefore, positioning accuracy deteriorates. To avoid the phenomenon, a technique in which servo patterns are recorded after high-density patterns are written to reduce effects of direct current signals has been proposed in JP-A No. 230734/2002. The technique makes it possible to reduce effects of direct signal components in a servo write process in particular. There have been problems, however, that servo patterns formed using the technique generate dc-signal responses and that the stability of the formed servo patterns cannot be enhanced.

As described above, it is not possible to manufacture a highly reliable magnetic disk apparatus using a combination of conventional servo patterns and vertical magnetic recording because direct current components cause generation of a bias field in a head, reduction in a reproduction waveform output and inadequacy in writing-ability of the head. Hence, development of servo patterns which can realize a large storage capacity based on a perpendicular magnetic recording method, which can be written easily while achieving stability over long periods of time, and which have a superior signal to noise (S/N) ratio has been desired.

In response to the above desire, the present invention provides optimum servo patterns for a vertical magnetic recording method.

To achieve the above object, the total magnetization of servo patterns is made approximately 0 by making up servo patterns with burst-signal parts in which a constant frequency occurs successively and zero-signal parts demagnetized to zero-magnetization. Before recording servo patterns to a disk, the disk is initialized to a state of zero-magnetization and, when recording servo patterns, zero-signal parts are generated by shutting off the write current in the head. There are two to four burst signals in a burst field, and recording on each burst-signal part is made in a different rotation period of the disk. By encoding track code fields using a phase shift encoding method, the total magnetization of all servo patterns is made 0 and the reproduction waveform base line is made approximately 0.

According to the present invention, the total magnetization of all servo patterns can be made approximately 0. When servo patterns according to the present invention are recorded on a disk to which perpendicular magnetic recording is applied, generation of dc-signal responses which cause a bias field to be generated in the disk can be suppressed, so that performance deterioration attributable to a bias field can be prevented. A bias field present when servo patterns are written to a disk induces jitter noise attributable to nonlinearity transition shifts and/or easy/hard transition shifts. Also, a bias field causes, when servo patterns are read out, the operational point of the reproduction device to be shifted to induce amplitude asymmetry errors in a reproduction waveform. Adopting the servo patterns of the present embodiment makes it possible to provide correctly timed, easy-to-reproduce servo patterns and realize a highly reliable magnetic disk apparatus with a high track density and a large capacity.

Overwrite performance can be improved by raising a lowest recording density of servo patterns. Adopting servo patterns according to the present invention makes it possible to provide servo patterns which, having a superior S/N ratio, facilitate saturation recording and to realize a highly reliable magnetic disk apparatus with a high track density and a large capacity.

Furthermore, a decrease in residual magnetization with the passage of time can be suppressed by raising the lowest recording density of servo patterns. Adopting servo patterns according to the present invention makes it possible to provide servo patterns which have a superior S/N ratio even after a long time and to realize a magnetic disk apparatus which remains highly reliable over extended periods of time.

DETAILED DESCRIPTION OF THE INVENTION

Embodiments of the present invention will be described in the following with reference to drawings.

Figure 2:
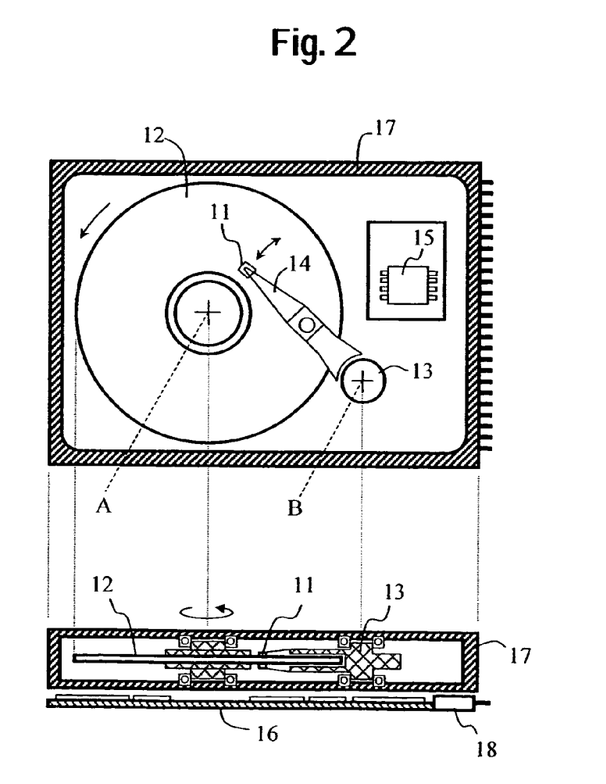
FIG. 2 is a diagram for explaining a configuration of a magnetic disk apparatus.

FIG. 2 shows a construction of a magnetic disk apparatus. A disk 12 is fixed to a motor having a center of rotation A and is rotated by the motor at 3,000 to 15,000 rpm. A head 11 which makes recording to and reproduction from the disk is fixed, via a suspension 14, to a rotary actuator 13 having a center of turning B and is driven back and forth in a radius direction of the disk 12 by the rotary actuator 13. These parts are housed in a disk enclosure 17 for protection from external dust and humidity. A preamplifier 15 is an electrical circuit which makes electrical exchanges between the head 11 and a circuit board 16. On the circuit board 16, LSIs including signal processing circuits and data transfer terminals for connection to an external host machine are mounted.

Figure 3:
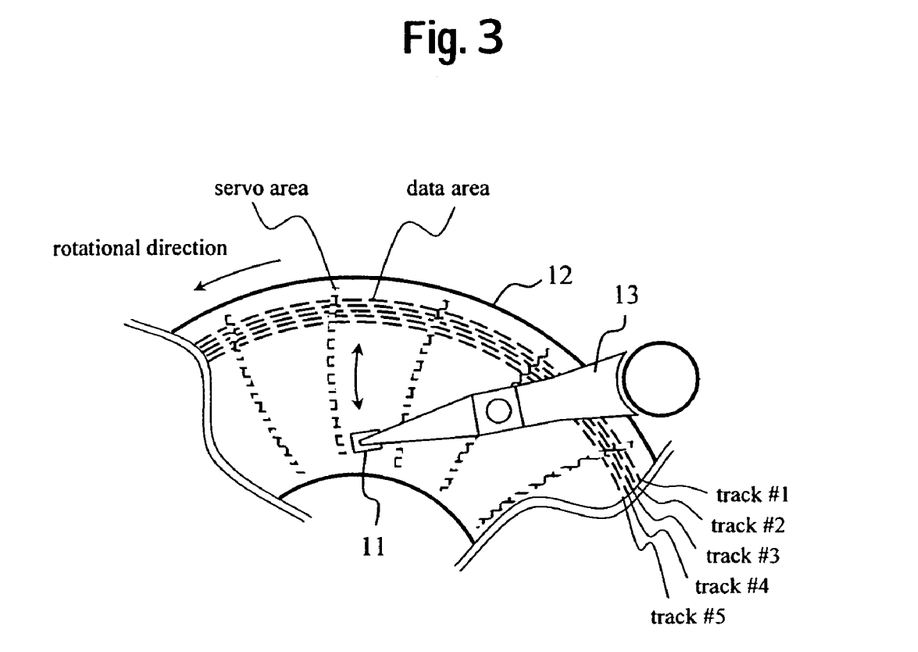
FIG. 3 is a diagram in which a part of a disk is shown enlarged to explain a relationship between a head and the disk.

An arrangement of servo patterns and data will be described with reference to FIG. 3 showing a partial enlarged view of the disk. The head 11 being driven by the rotary actuator 13 can be moved to any radial position on the disk 12. User information is written to and read from data areas. At that time, a head position signal decoded from a servo pattern is used to follow a target track. A large number of concentric circular tracks are formed in the data areas. In FIG. 3, for the sake of descriptive convenience, only five tracks are shown with the width of each track extremely enlarged. In reality, 100,000 or more tracks are magnetically formed, each with a track width in the range of several tens of nanometers to several hundred nanometers. The servo patterns are arranged radially across the data areas.

Figure 4:
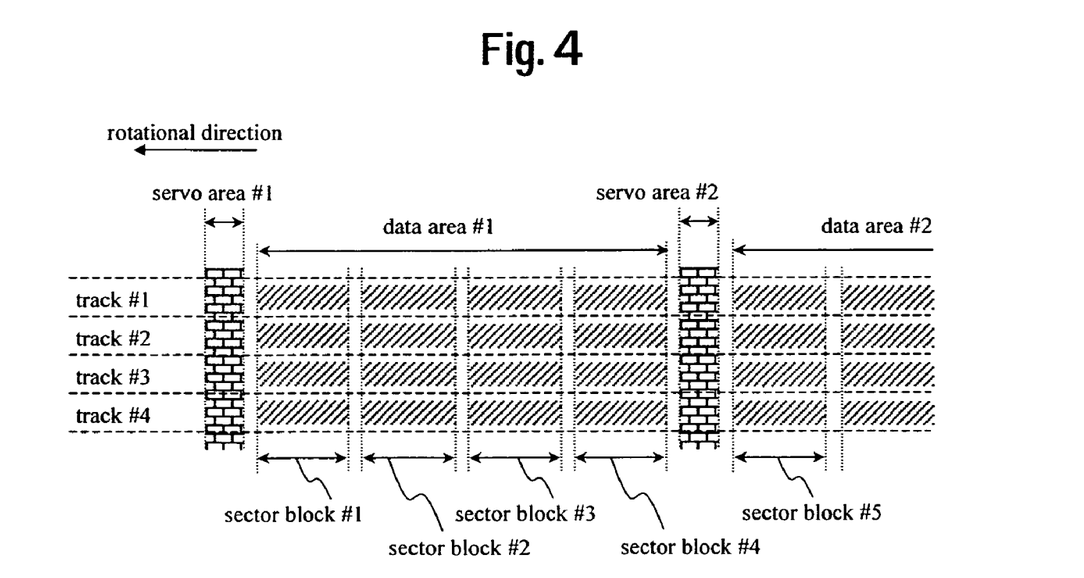
FIG. 4 is a diagram for explaining a layout of servo areas and data areas.

FIG. 4 shows a layout of servo patterns and data areas. In this explanatory diagram, tracks are enlarged widthwise. The servo patterns and data areas are positioned alternately and approximately equidistantly along the direction of the disk rotation. About 100 to several hundred servo patterns are arranged along the tracks. A data area (#1) has plural discrete tracks and each of the tracks is divided into plural sector blocks (#1 to #4). A sector block is a minimum unit to or from which data can be written or read. Each sector block is composed of 512 bytes or 4096 bytes of data. Data written in the data areas is rewritable according to instructions given by a user. The servo patterns are factory written before shipment and they are not rewritten by a user.

Embodiment 1

Figure 1:
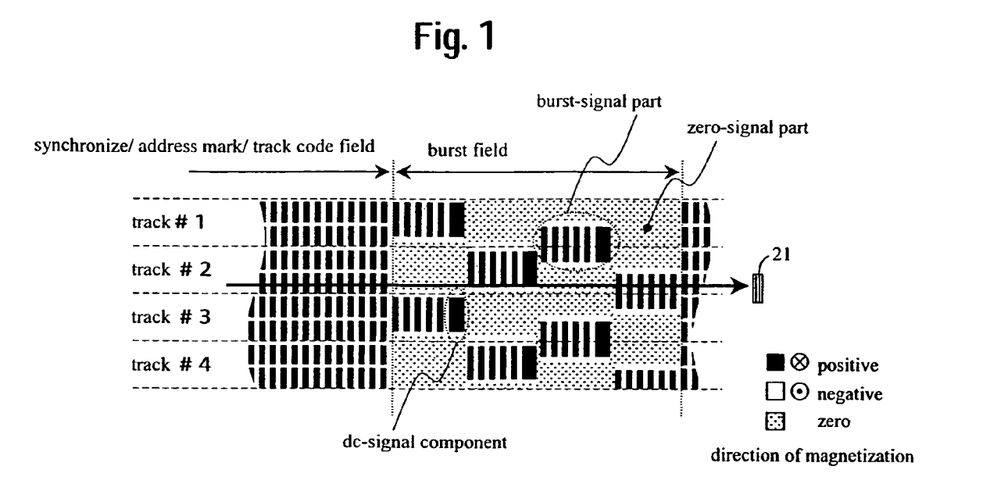
FIG. 1 is a diagram showing a first example of servo patterns of a magnetic disk apparatus according to the present invention.

A servo pattern configuration in a burst field according to an embodiment of the present invention is shown in FIG. 1. In FIG. 1, the horizontal direction represents the direction of the disk rotation and the vertical direction represents the radius direction of the disk. The head is fixed to a rotary actuator. The disk rotates at a speed of 5 to 50 meters per second in the right-to-left direction based on the figure. This may relatively be described as "the head travels in the left-to-right direction based on the figure". This way of relative description may be easier to understand. The subsequent description will therefore be made regarding the head as traveling over the disk.

FIG. 1 shows an example configuration of a portion extending over tracks #1 to #4 of areas which are shown as servo patterns in FIGS. 3 and 4. In FIG. 1, the configuration is shown greatly enlarged in the vertical direction. For the present embodiment, a burst field will be described. An address mark field and a track code field will be described later in terms of the subsequent embodiment.

Servo patterns of a magnetic disk apparatus according to the present embodiment is characterized in that they include zero-signal parts. Conventional servo patterns as shown in FIG. 5 are composed of burst-signal parts and dc-signal parts. Whereas magnetization of the burst-signal parts is almost zero, direct current portions are magnetized in one direction, that is, either positively or negatively. In contrast, zero-signal parts included in servo patterns according to the present embodiment are areas, magnetization of which is approximately zero. Therefore, the total magnetization of the entire burst section inclusive of the burst-signal parts is approximately zero. Each of the burst-signal parts includes a dc-signal component. The dc-signal component facilitates time control in forming servo patterns.

Figure 13:
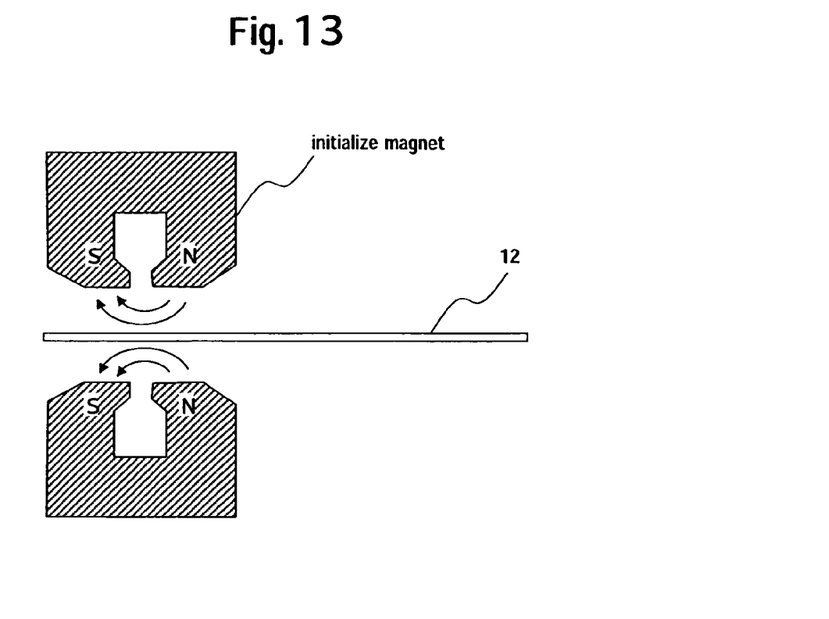
FIG. 13 is a diagram for explaining a method for initializing a disk when forming servo patterns according to the present invention.

A method for forming servo patterns according to the present embodiment will be described with reference to FIG. 9. Before forming servo patterns on a disk, the disk is entirely initialized using a magnet or a recording device so as to entirely demagnetize the disk to a state of zero-magnetization. When using a magnet to initialize a disk, the disk can be initialized by, as shown in FIG. 13, gradually moving the magnetic field of the magnet away from the disk while rotating the disk whose axis of easy magnetization lies in the vertical direction. When this is done, the magnetic field to which the disk is subjected alternates in polarity and weakens gradually in intensity. The residual magnetization of the recording layer of the disk also gradually weakens while its polarity symbols alternate, eventually causing the recording layer to be demagnetized almost completely. The magnet used in the present embodiment is horizontally magnetized. Instead of the horizontally magnetized magnet, two vertically magnetized magnets to generate an alternating magnetic field may be used.

Figure 17:
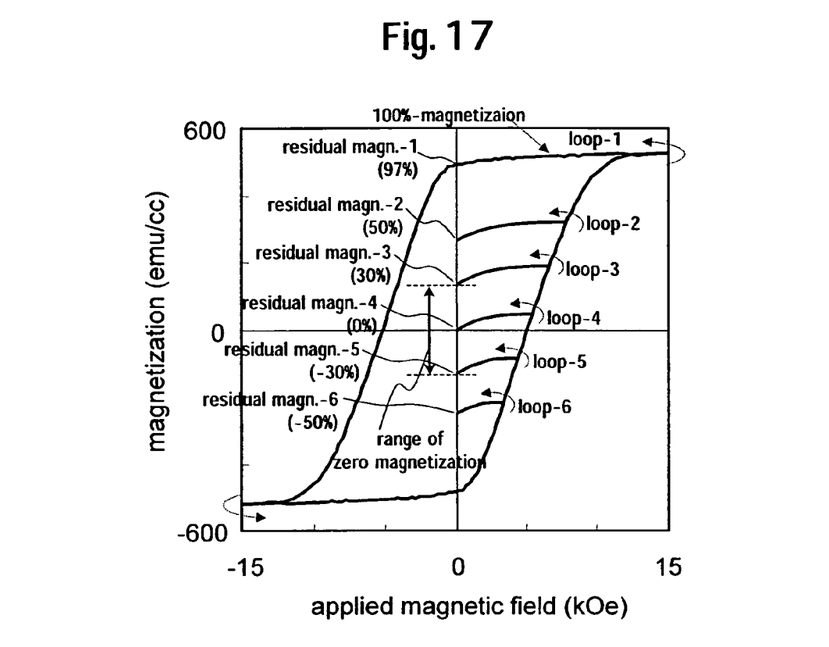
FIG. 17 is a diagram for explaining hysteresis loops of a perpendicular recording medium, residual magnetization, and a state of zero-magnetization.

FIG. 17 shows hysteresis loops of applied magnetic field versus magnetization of a recording film in an initialization process. To make description simpler, the hysteresis loops are based on an example case of initialization in which the magnetic field is reversed only once. In real initialization, repeatedly reversing the magnetic field is desirable. The curve denoted as loop-1 in the figure is a hysteresis loop plotted when a magnetic field so large as to completely saturate the recording film is applied. Once the recording film is saturated, residual magnetization, denoted as residual magnetization-1, equivalent to 97% of the saturation magnetic field remains even after the magnetic field is removed. Loops 2 to 6 are hysteresis loops plotted when a magnetic field not so large as to saturate the recording film is applied. The residual magnetizations that remain even after removal of the magnetic field are denoted as residual magnetizations 2 to 6 corresponding to the loops 2 to 6.

The servo recording method according to the present invention can have a problem that a large magnetization if residual in a disk after an initialization process becomes a noise component of the servo patterns formed on the disk and thereby increases the RRO error component of the servo patterns. Since the maximum permissible value of RRO error component attributable to residual magnetization is 30%, it is also necessary to limit residual magnetization generated in a disk initialization process to within a range of □30%. From this point of view, in the present invention, a residual magnetization of within □30% is referred to as zero-magnetization. It is known from FIG. 17 showing hysteresis loops that a disk can be satisfactorily initialized to zero-magnetization through an initialization process in which an alternating magnetic field in the ranges corresponding to the loops 3 to 5 is applied. Besides a process in which a magnet is used, a method in which a disk as a whole is heated to over the Curie temperature of the recording film can also be used to initialize the disk to zero-magnetization.

The residual magnetization of a disk after initialization can be measured using a spin-polarized scanning electron microscope. Or, more easily, it is possible to estimate the residual magnetization of a disk after erasure to zero-magnetization by measuring the magnetic field leak from the disk surface using hole elements and then comparing the measurement with a corresponding value measured in a DC-erased state.

Figure 9:
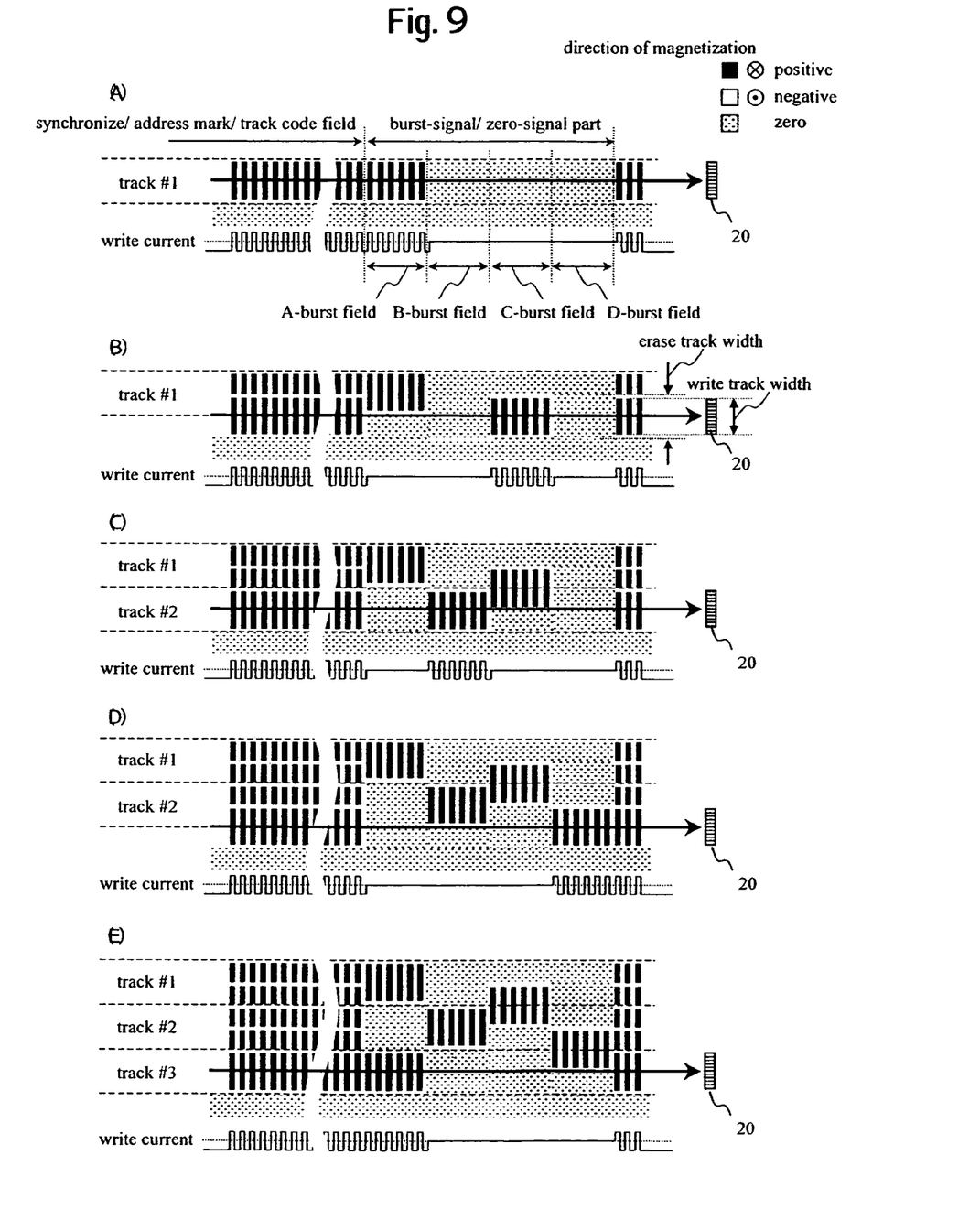
FIG. 9 illustrates how servo patterns according to the present invention are formed.

After a disk is initialized, a signal is newly written to only a burst portion A by applying a write current shown in FIG. 9A. At this time, areas composed of burst portions B to D for which the write current was shut off remain unchanged as zero-signal parts, that is, in the state generated when the disk was initialized beforehand. Next, after shifting the position of the recording device by a distance equal to one half the track width, a signal is newly written to only the burst portion C by applying a write current shown in FIG. 9B. At this time, areas composed of burst portions A, B, and D for which the write current was shut off remain unchanged as zero-signal parts, that is, in the state generated when the disk was initialized beforehand.

Figure 14:
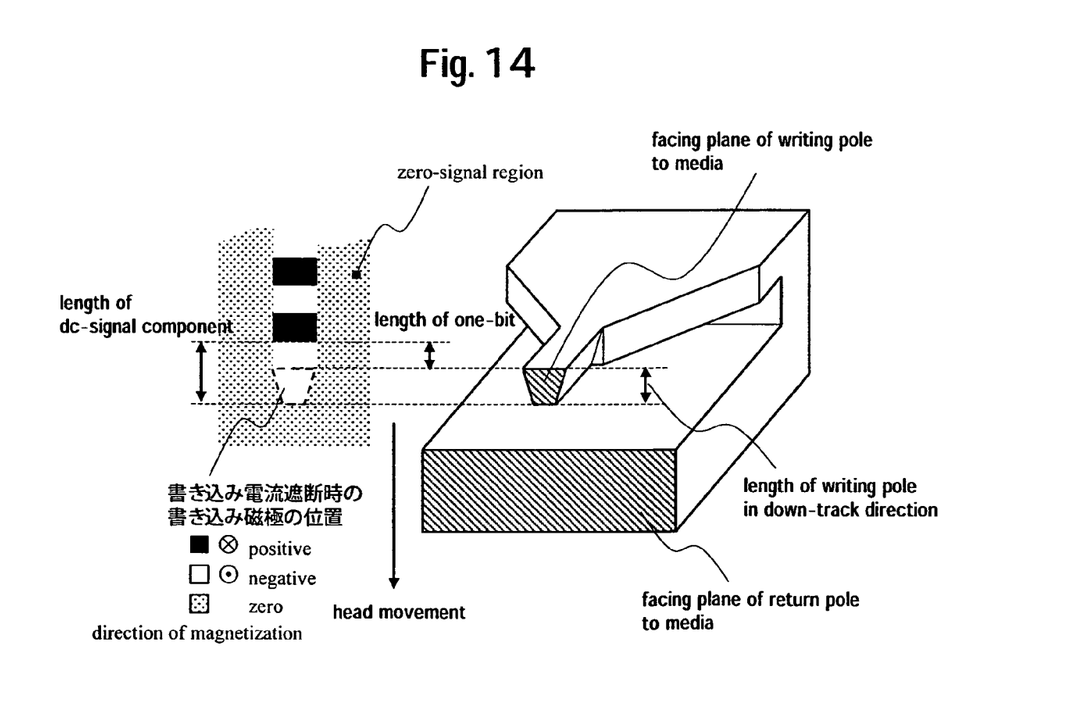
FIG. 14 is a diagram for explaining a configuration of a recording device of a head and the length in the down-track direction of a recording magnetic pole.

The last bit of each burst-signal part is characterized in that the pattern written on it is longer than the patterns written on other bits. The longer pattern is called a dc-signal component. As shown in FIG. 14, the length of the dc-signal component is equal to the sum of the length of one bit of the burst-signal part and the length of the writing pole in the head down-track direction. Writing the dc-signal component of that length makes it possible to shut off the write current in synchronization with a write clock pulse after recording each burst-signal part. Therefore, servo patterns according to the present embodiment can be formed with more ease.

A gap is seen along the center of track #1. It is because, with the erase track width of the head being larger than the write track width, an area to which patterns cannot be written occurs along an edge of the head's track. Subsequently, by applying write currents as shown in parts (C) to (E) of FIG. 9 each time shifting the position of the recording device by a distance equal to one half the track width as described above, the servo patterns of the present embodiment as shown in FIG. 1 can be formed.

Figure 10:
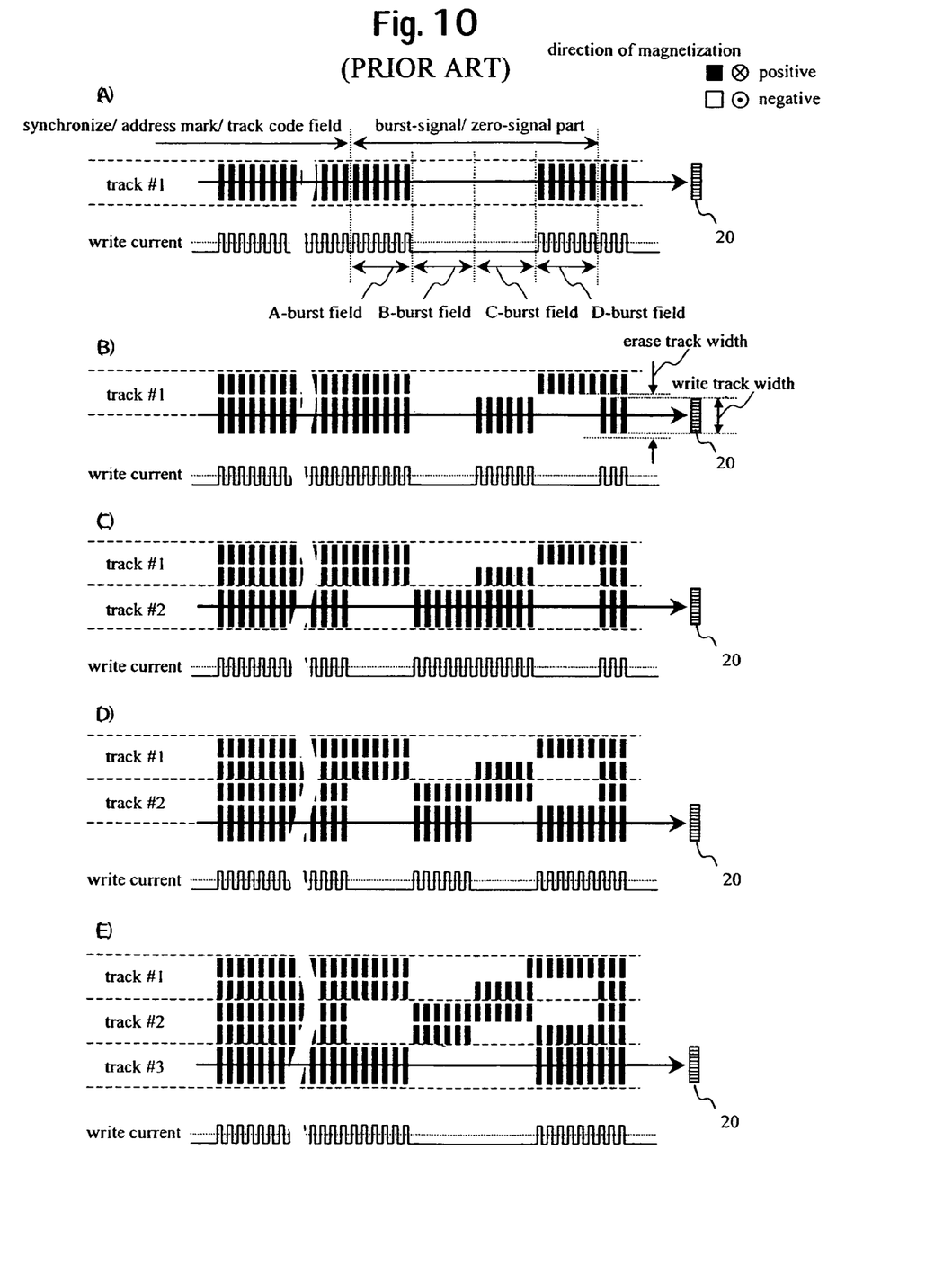
FIG. 10 illustrates how conventional servo patterns are formed.

For comparison purposes, a conventional method of servo pattern generation is shown in FIG. 10. In the conventional method, since a write current is constantly applied, dc-signal parts are generated outside burst-signal parts causing great bias magnetization.

The servo patterns of the present embodiment recorded using the process described above can make the total magnetization of a whole burst field including burst-signal parts and zero-magnetization portions approximately zero. Therefore, performance deterioration, as described in the foregoing "Background of the Invention," attributable to a bias field generated by a direct current signal can be prevented. Particularly, in writing, nonlinearity transition shifts and/or easy/hard transition shifts can be suppressed, so that correctly timed servo patterns with little jitter noise can be formed. In reading, it is possible to correctly maintain a bias point of a reproduction device. As a result, a reproduction waveform without many amplitude asymmetry errors can be obtained. Furthermore, with the dc-signal response reduced, servo patterns with superior thermal decay resistance can be generated. For head position signal demodulation, a conventional type of servo demodulator circuit can be used. Owing to these effects, a highly reliable magnetic disk apparatus with a high track density and a large capacity can be realized.

Embodiment 2

Figure 11:
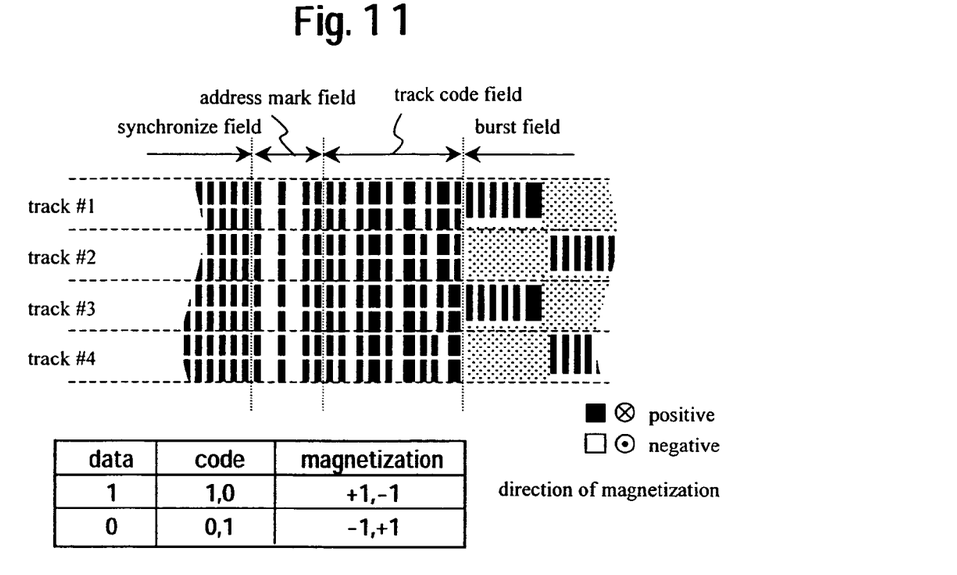
FIG. 11 is a diagram showing a second example of servo patterns of a magnetic disk apparatus according to the present invention.

FIG. 11 shows servo patterns of a magnetic disk apparatus according to another embodiment. For the present embodiment, only an address mark field and a track code field will be described.

Conventional servo patterns shown in FIG. 5 are generated by a dibit encoding method which is widely adopted for products for which in-plane recording is made. In the dibit encoding method, data 1 is encoded into a magnetization pattern of 1 and 1, and data 0 is encoded into a magnetization pattern of 1 and 1: where 1 represents magnetization in the positive direction and 1 represents magnetization in the negative direction. Therefore, when the method is used in combination with a perpendicular magnetic recording method, the total magnetization is biased in the negative direction according to the number of data 0. Particularly, In the case of perpendicular magnetic recording, in particular, there is a problem that biased magnetization results in a bias field to be applied to the head to eventually degrade demodulation performance. Furthermore, depending on the track number code data, data 0 occurs ten or more times successively in servo patterns making the servo pattern recording density 10 times or more lower than that of a synchronize field. When a perpendicular magnetic recording method is used, the reproduction output decreases more where the recording density is lower as shown in FIG. 7. Therefore, when the conventional technology is used, the S/N ratio in the track code field deteriorates with the passage of time.

In the address mark field and the track code field of servo patterns of the present embodiment, on the other hand, data 1 is represented by a magnetization pattern of 1 and 1, and data 0 is represented by a magnetization pattern of 1 and 1. This method is called a phase shift encoding method. When the method is used in combination with a perpendicular magnetic recording method, the total magnetization can be made 0 regardless of the ratio between occurrences of data 1 and data 0. Since the servo patterns of the present embodiment do not cause generation of a bias field, deterioration of characteristics in recording or reproduction can be prevented. Furthermore, by using the encoding method, the lowest frequency of the track code recording density can be made one half the recording density of the synchronize field. As a result, compared with the conventional servo patterns, the servo patterns of the present embodiment can largely improve the problem in which the reproduction output decreases. Also as compared with the conventional servo patterns, overwrite performance can be greatly improved.

Another example of servo patterns of the present embodiment will be described. For the address mark field and the track code field according to the embodiment, encoding is made using a combination of the above-described phase shift encoding and exclusive-or (XOR) operation. For example, a string of 10 bits 1110101000 is converted to 10101001100110010101 by phase shift encoding and then to 11111010101010111110 (based on the assumption that the subsequent bit is 1) by XOR operation. As a result, magnetization patterns +1, −1, +1, −1, +1, −1, −1, +1, +1, −1, −1, +1, +1, −1, −1, +1, −1, +1, −1, +1 are formed on the disk. This encoding method is called a biphase encoding method. By using this encoding method in combination with a perpendicular magnetic recording method, the total magnetization can be made 0 regardless of the ratio between occurrences of data 1 and data 0.

Figure 12:
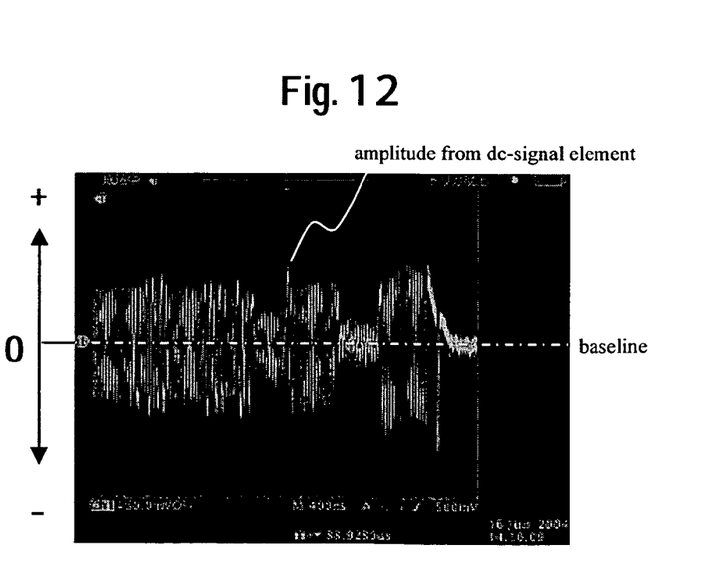
FIG. 12 is a diagram showing an example reproduction waveform of servo patterns of a magnetic disk apparatus according to the present invention.

A reproduction waveform obtained from a combination of the address mark field and the track code field according to the present embodiment and the burst section described in Embodiment 1 and perpendicular magnetic recording is shown in FIG. 12. Compared with the reproduction waveform, shown in FIG. 6, obtained from a combination of the conventional servo patterns and perpendicular magnetic recording, the baseline shown in FIG. 12 is correctly maintained at zero level. This indicates that the total magnetization of servo patterns is approximately 0. A signal with a comparatively large amplitude is reproduced from the dc-signal component written at the end of each burst-signal part. By combining the servo patterns described in the present embodiment with perpendicular magnetic recording technology, the problem attributable to biased magnetization can be greatly improved and a highly reliable magnetic disk apparatus with a large capacity can be realized.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A servo information recording method for recording a burst field comprising a burst-signal part in which a constant frequency occurs successively on magnetic recording media, the method comprising:

initializing magnetization of the magnetic recording media to a state of zero-magnetization;

writing the burst-signal part to the magnetic recording media by passing a write current through a write head; and forming a zero-signal part by shutting off the write current flowing through the write head to leave the state of zero-magnetization on the magnetic recording media;

wherein the burst field is formed using a combination of writing the burst-signal part to the magnetic recording media by passing the write current through the write head and forming the zero-signal part by shutting off the write current flowing through the write head to leave the state of zero-magnetization on the magnetic recording media.

2. The servo information recording method according to claim 1, wherein the burst field comprises a plurality of burst-signal parts and each of the burst-signal parts is recorded by initializing magnetization of the magnetic recording media to the state of zero-magnetization in a different rotation period of the magnetic recording media.

3. The servo information recording method according to claim 1, wherein the state of zero-magnetization is generated by, while rotating the magnetic recording media, gradually moving a magnet away from a surface of the magnetic recording media.

4. The servo information recording method according to claim 1, further comprising forming a short dc-signal component between the burst-signal part and the zero-signal part, the dc-signal component being equal in length to a sum of a length of one bit of the burst-signal part and a length of a writing pole of the head in a down-track direction.

5. The servo information recording method according to claim 1, further comprising encoding a track code field in the servo information by a phase shift method.

6. A magnetic recording media on which a burst field is recorded comprising a burst-signal part in which a constant frequency occurs successively has been recorded, wherein the burst field has been formed using a combination of writing a burst-signal part to the magnetic recording media, magnetization of which has been initialized to a state of zero-magnetization, by passing a write current through a write head; and generating a zero-signal part by shutting off the write current flowing through the write head to leave the state of zero-magnetization.

7. The magnetic recording media according to claim 6, wherein the burst field comprises a plurality of burst-signal parts, each of the burst-signal parts having been recorded by passing a write current through the write head in a different rotation period of the magnetic recording media.

8. The magnetic recording media according to claim 6, wherein a short dc-signal component is formed between the burst-signal part and the zero-signal part, the dc-signal component being equal in length to a sum of a length of one bit of the burst-signal part and a length of a writing pole of the head in a down-track direction.

9. The magnetic recording media according to claim 6, further comprising a track code field which has been encoded by a phase shift method.

10. The magnetic recording media according to claim 6, wherein a baseline of a waveform reproduced from the burst-signal part and the zero-signal part is approximately 0.

11. The magnetic recording media according to claim 6, wherein a total magnetization of the burst-signal part and the zero-signal part is approximately 0.

12. A magnetic disk apparatus comprising a magnetic disk, a disk drive section for driving the magnetic disk, a head for performing recording to and reproduction from the magnetic disk, and a head drive section configured to position the head over a track on the disk, wherein the magnetic disk comprises a data area which holds data composed of information magnetized mainly in a direction perpendicular to a film surface and a servo area in which servo information for demodulating a head position signal is recorded, the servo information comprising a burst-signal part in which a constant frequency occurs successively and a zero-signal part in a state of zero-magnetization.

13. The magnetic disk apparatus according to claim 12, wherein a short dc-signal component is formed between the burst-signal part and the zero-signal part, the dc-signal component being equal in length to a sum of a length of one bit of the burst-signal part and a length of a writing pole of the head in a down-track direction.

14. The magnetic disk apparatus according to claim 12, wherein the servo information comprises a track code field which has been encoded by a phase shift method.

15. The magnetic disk apparatus according to claim 12, wherein a baseline of a waveform reproduced from the burst-signal part and the zero-signal part is approximately 0.

16. The magnetic disk apparatus according to claim 12, wherein a total magnetization of the burst-signal part and the zero-signal part is approximately 0.

* * * * *